(12) United States Patent
Becka (10) Patent No.: US 9,187,107 B2
(45) Date of Patent: Nov. 17, 2015

(54) HANDLE CART (71) Applicant: George T. Becka, North Royalton, OH (US)

(72) Inventor: George T. Becka, North Royalton, OH (US)

( * ) Notice: Subject to any disclaimer, the term of this patent is extended or adjusted under 35 U.S.C. 154(b) by 0 days.

(21) Appl. No.: 14/174,443

(22) Filed: Feb. 6, 2014

(65) Prior Publication Data

US 2014/0306410 A1 Oct. 16, 2014

Related U.S. Application Data

(60) Provisional application No. 61/811,383, filed on Apr. 12, 2013.

(51) Int. Cl.
*B62B 1/00* (2006.01)
*B62B 1/14* (2006.01)
*B62B 1/26* (2006.01)

(52) U.S. Cl.
CPC . *B62B 1/14* (2013.01); *B62B 1/264* (2013.01); *B62B 2202/028* (2013.01); *B62B 2202/12* (2013.01)

(58) Field of Classification Search
CPC .............. B62B 1/00; B62B 1/14; B62B 1/264
USPC ............ 280/79.5, 79.7, 47.131, 47.24, 47.27, 280/655, 79.3
See application file for complete search history.

(56) References Cited

U.S. PATENT DOCUMENTS

| | | | | |
|---|---|---|---|---|
| 2,044,363 A * | 6/1936 | Morse et al. | ................ | 280/47.27 |
| 2,837,305 A * | 6/1958 | Andren | ......................... | 248/148 |
| 3,612,563 A * | 10/1971 | Kazmark, Sr. | ................ | 280/655 |
| 4,200,323 A | 4/1980 | Cocksedge | | |
| 4,396,174 A | 8/1983 | Continenza et al. | | |
| 4,896,897 A * | 1/1990 | Wilhelm | ........................ | 280/655 |
| 4,993,767 A | 2/1991 | Song | | |
| 5,069,495 A * | 12/1991 | Mears | ............................. | 294/15 |
| 5,584,520 A | 12/1996 | Niemeier | | |
| 6,053,576 A * | 4/2000 | Jessee | ....................... | 297/344.19 |
| 6,102,458 A | 8/2000 | Scace | | |
| 6,250,655 B1 * | 6/2001 | Sheeks | ......................... | 280/79.7 |
| 6,266,849 B1 | 7/2001 | Petit et al. | | |
| 6,315,310 B1 * | 11/2001 | Hurt | ............................. | 280/79.5 |
| 6,382,691 B2 | 5/2002 | Hazelton | | |
| 6,419,246 B1 * | 7/2002 | Neal | ............................. | 280/79.5 |
| 7,178,812 B1 * | 2/2007 | Bryan | ........................ | 280/47.24 |
| 7,387,323 B1 | 6/2008 | Minnette et al. | | |
| 7,431,313 B1 | 10/2008 | Torres et al. | | |
| 7,604,270 B1 | 10/2009 | McCarthy | | |
| 8,262,106 B1 * | 9/2012 | Suszynsky | ............... | 280/47.131 |
| 8,636,291 B1 * | 1/2014 | Kay | ............................. | 280/79.5 |
| 2003/0020249 A1 * | 1/2003 | Webster et al. | ................. | 280/43 |
| 2010/0051567 A1 | 3/2010 | Ross, Jr. | | |

* cited by examiner

*Primary Examiner* — Hau Phan
(74) *Attorney, Agent, or Firm* — Emerson, Thomson & Bennett (57) ABSTRACT

One or more techniques and/or systems are disclosed for a container transport device. A base member may be coupled with a handle, one or more wheel members and a base engaging member. The handle can have a grip disposed at one end, and may be used to tilt and move the device. Further, a clamping member can be selectively engaged with the handle, and may be used to engage a top portion of a target container, using a top notch disposed in the clamping member. The base engaging member may be configured to engage the bottom of the target container, thereby holding the container in place during lifting and/or transportation. The wheel member(s) can support the base member off a floor surface, and help move the device during transportation of a container.

5 Claims, 9 Drawing Sheets

HANDLE CART

This application claims priority to U.S. Provisional Patent Application Ser. No. 61/811,383, filed Apr. 12, 2013, which is incorporated herein by reference.

BACKGROUND

Some containers may be sized such that manual lifting is unwieldy, and/or may comprise materials too heavy for a person to safely lift manually. Various types of carts/dollys can be used to facilitate lifting and transportation of such containers. Some carts/dollys can be configured for particular types of containers, where a container is of particular size, shape and/or weight.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a type of container transport device, such as a hand cart, which may be useful in lifting and transportation of certain containers, such as cans, buckets and/or drums. In one implementation, an exemplary container transport device can comprise a base member. In this implementation, the base member can be operably coupled with one or more wheel members that are configured to support the base member above a floor surface, and to provide mobility to the device. Further, a handle can be selectively engaged with the base member at a first end of the handle, and a grip can be disposed at a second end of the handle. The handle can be configured to cause the base member to rotate around a base member lateral axis that corresponds to an angular displacement of the handle.

Additionally, a clamping member can be selectively engaged with the handle and configured to slide along at least a portion of a length of the handle to engage a top portion of a container. The clamping member can comprise a top notch disposed at a first end configured to selectively engage a top portion of a first container, and may also be configured to rotate around a handle. A base engaging member may be operably coupled with the base member, and can be configured to selectively engage a bottom portion of the first container.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1A:
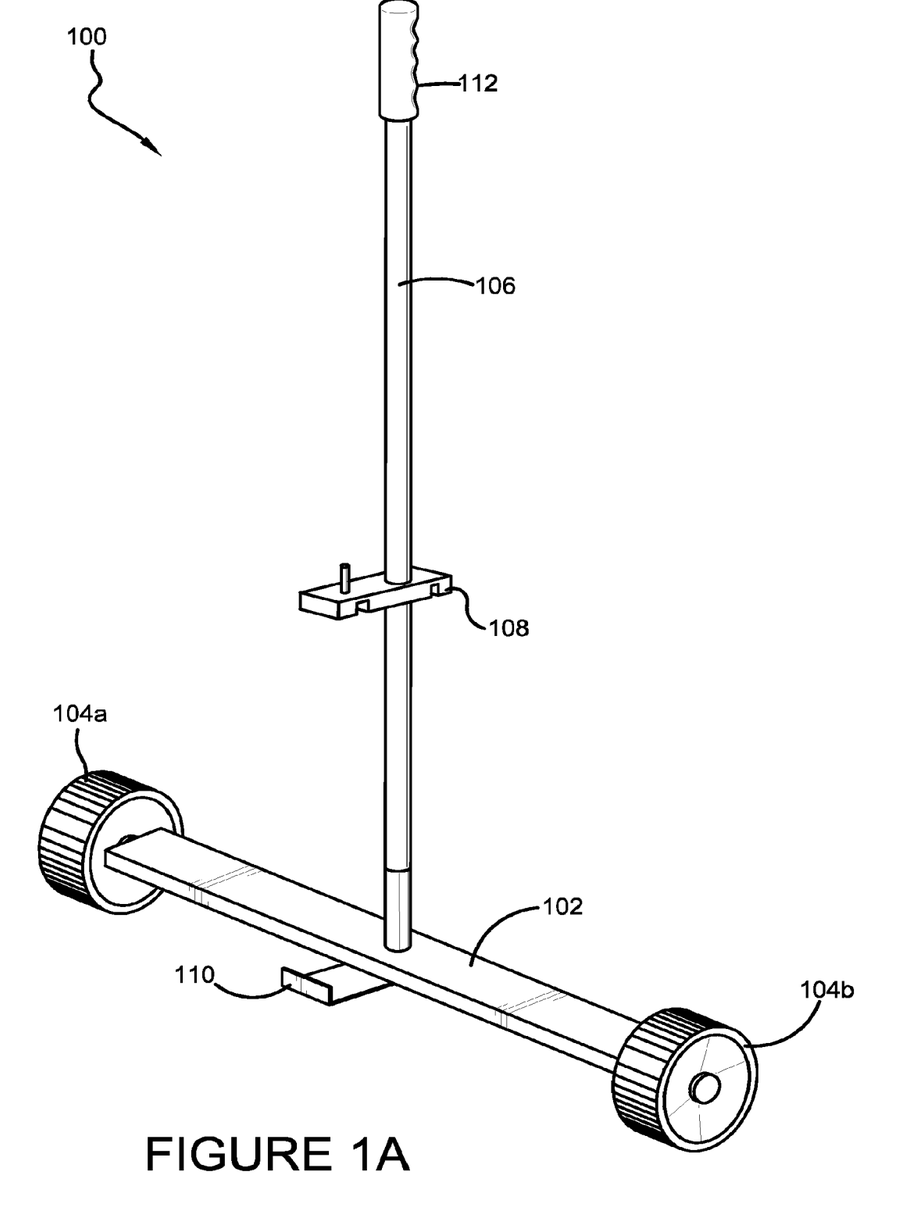
FIG. 1A is a component diagram illustrating one implementation of an exemplary container transport device.

A container transport device may be configured to engage a container at a first location, lift the container from a floor surface, and manually transport (e.g., by manual human power) the container to a second location, for example. FIG. 1A is a component diagram illustrating one implementation of an exemplary container transport device 100. In this implementation, the exemplary device 100 comprises a base member 102. One or more wheel members 104 are operably coupled with the base member 102. The one or more wheel members 104 are configured to support the base member 102 above a floor surface, and are configured to provide mobility to the exemplary device 100.

In one implementation, the base member 102 may comprise a bar comprising metal, wood, plastic, polymer, graphite, fiberglass, and/or a mixture thereof. In one implementation, the base member 102 may comprise a frame comprising metal, wood, plastic, polymer, graphite, fiberglass and/or a mixture thereof. In one implementation, the one or more wheel members 104 can comprise wheels comprising metal, wood, plastic, polymer, graphite, rubber, fiberglass, and/or a mixture thereof. In one implementation, the one or more wheel members 104 may comprise a pneumatic composition, for example, such that a hub portion may comprise a first material (e.g., metal, plastic, etc.) and a tire portion may comprise a flexible material (e.g., rubber and/or polymer) that is pneumatically inflated. In one implementation, the tire portion may merely be applied to a perimeter of the hub portion, and may not be pneumatically inflated.

In one implementation, a first wheel member 104a may be disposed at, and rotationally engaged with (e.g., by an axle member), a first end of the base member 102; and a second wheel member 104*b* can be disposed at, and rotationally engaged with, a second end of the base member 102. In this way, for example, where the base member 102 is coupled to an approximate center of the respective wheel members 104*a*, 104*b*, the wheel members 104 can support the base member 102 off a floor on which the exemplary device 100 (e.g., and a container selectively engaged with the device 100) is being transported. In one implementation, the one or more wheel members 104 may be configured to be selectively folded into a storage position. For example, respective wheel members 104*a*, 104*b* may be lifted upward and flipped in toward a center of the base member 102, to provide a smaller storage footprint.

In FIG. 1A, the exemplary device 100 further comprises a handle 106 that is selectively engaged with the base member 102 at a first end of the handle 106. The handle 106 can comprise a grip 112 disposed at a second end of the handle 106. The handle 106 is configured to cause the base member 102 to rotate around a base member lateral axis, where the rotation of the base member 102 corresponds to an angular displacement of the handle 106. For example, a user may tilt the handle 106 downward (e.g., by gripping the grip 112 and pulling or pushing it downward), which can cause the base member 102 to rotate around the base member lateral axis a distance corresponding to the angular displacement of the handle 106 moving downward, in a same direction as the angular displacement.

Figure 1B:
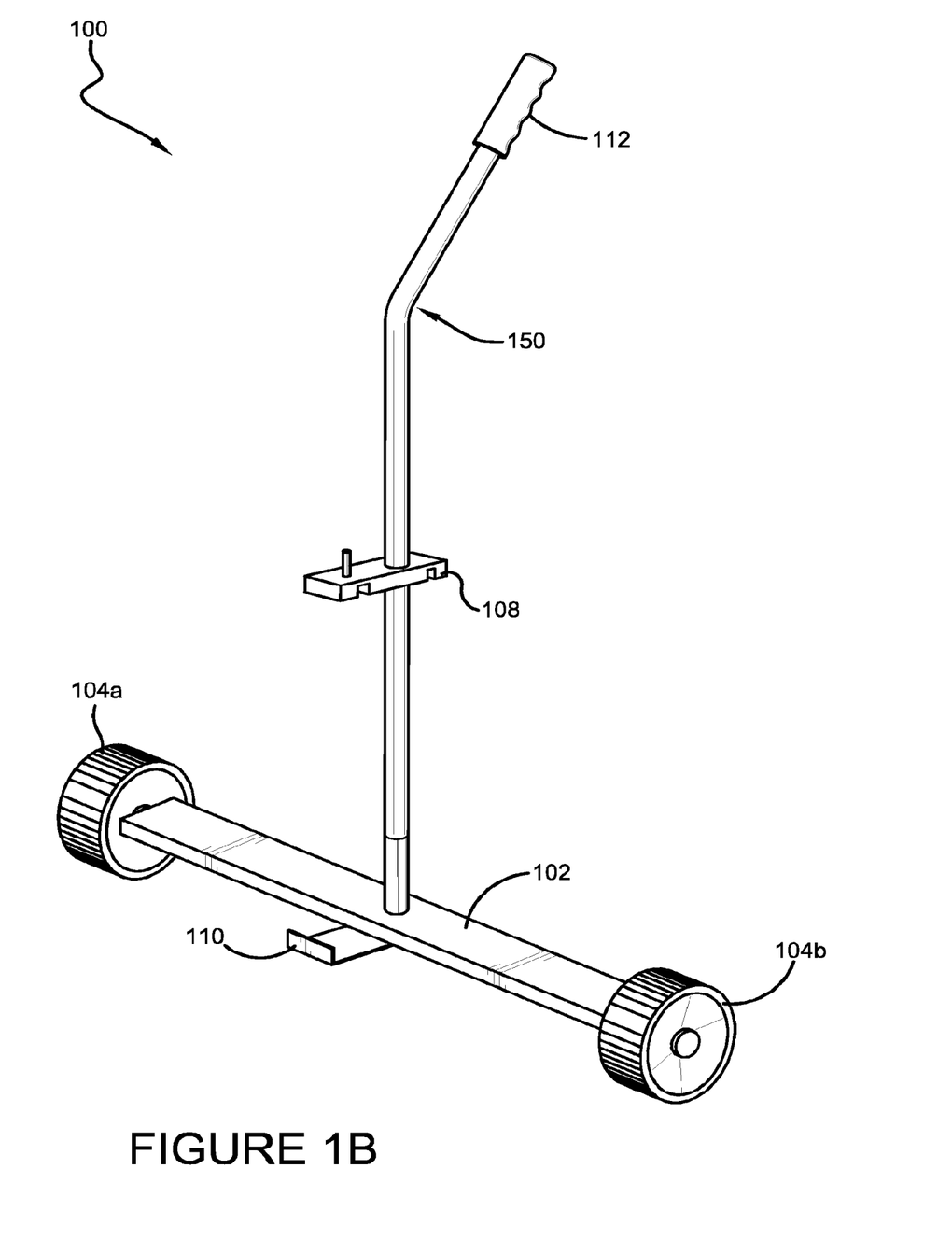
FIG. 1B is a component diagram illustrating and example implementation of at least a portion of a container transport device.

In one implementation, as illustrated in FIG. 1B, the handle 106 may comprise a bend 150, and/or some other-than-straight configuration. In one implementation, the bend 150 in the handle 106 may be configured to provide an ergonomic design for lifting and/or transporting a container using the exemplary device 100. That is, for example, the handle 106 may be bent at an angle (e.g., 150) that allows the user to more easily lift and transport the container than if the handle 106 were merely straight (e.g., as in FIG. 1A). In one implementation, the handle 106 may comprise metal, wood, plastic, polymer, graphite, fiberglass and/or a mixture thereof. Further, the grip 112 may comprise a separate piece that is engaged with the handle 106, or the grip 112 may formed with the handle (e.g., milled, molded, forged, etc.).

Additionally, the first end of the handle 106 may comprise a shaped portion that effectively, selectively engages with a receiving portion of the base member 102. In one implementation, the shaped portion may comprise a male threaded configuration (e.g., molded, milled, forged, etc. in to the handle 106), which can be selectively engaged with a female threaded portion in the base member 102. In one implementation, the shaped portion may comprise a tapered portion that is configured to be received by a hole in the base member 102, and further fastened to the base member (e.g., using a fastener that secures the handle to the base member). In one implementation, the handle 106 may be formed with or welded to the base member 102. In one implementation, the handle 106 may be engaged with the base member at a desired angle, for example, where the desired angle provides an appropriate ergonomic design for lifting and/or transporting a container using the exemplary device 100.

Figure 3:
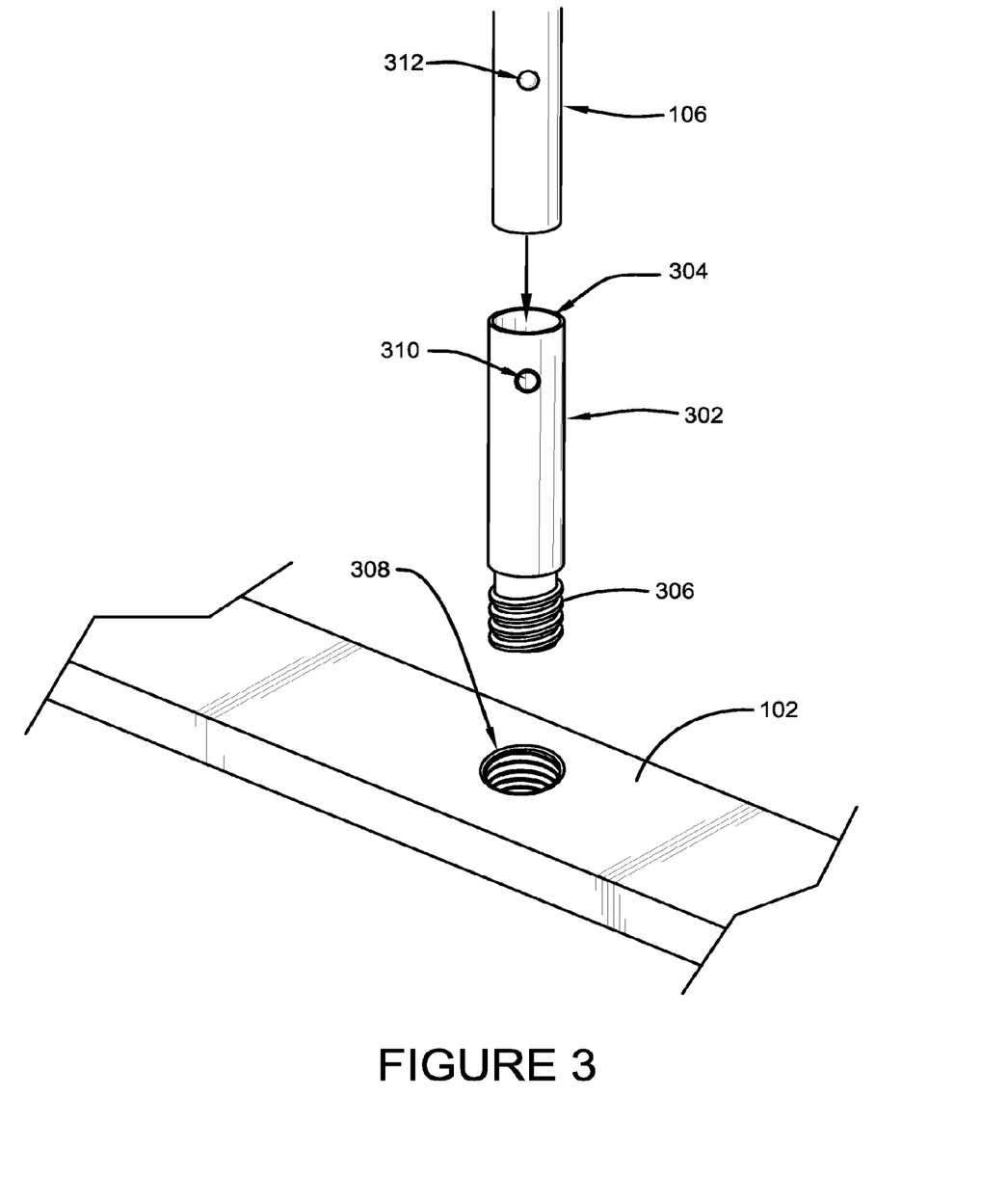
FIG. 3 is a component diagram illustrating and example implementation of at least a portion of a container transport device.

FIG. 3 is a component diagram illustrating one example implementation of a portion of a container transport device. In one implementation, the handle 106 may be operably engage with an attachment adapter 302, which can be selectively engaged with the base member 102. In this implementation, the attachment adapter 302 can comprise an opening 304 configured to selectively or fixedly receive the handle 106. Further, the attachment adapter 302 can comprise a base member engagement member 306 configured to selectively engage with the base member 102. In one implementation, the base member can comprise an adapter receiver 308 configured to selectively receive the base member engagement member 306. In one implementation, the base member engagement member 306 may comprise male threads configured to engage female threads disposed in the adapter receiver 308. In this way, for example, the attachment adapter 302 may be selectively screwed into the base member 102, effectively attaching the handle to the base member.

In one implementation, the attachment adapter 302 may comprise a button via 310 configured to selectively receive a corresponding handle button 312. In this implementation, for example, the handle 106 may be inserted into the opening 304 of the attachment adapter 302 at least until the handle button 312 is biased through the button via 310. That is, for example, the handle button 312 may be biased outward (e.g., by a retention spring in the handle 106), and the handle button 312 can be refracted into the handle 106 (e.g., by pushing the button in) when the handle 106 is inserted into the opening 304. In this example, when the handle button 312 reaches the button via 310, the biasing can force the handle button 312 out, into the button via 310. In this way, for example, the handle 106 may be appropriately fixed to the attachment adapter 302.

In one implementation, the handle 106 may comprise an extendable (e.g., telescoping) handle. That is, for example, the handle 106 may be configured to be selectively extendable. In one implementation, the handle may comprise two or more sections that are configured to telescope out to extend the handle. In one implementation, the handle may comprise a button and via system (e.g., such as described in FIG. 3), for example, where a section of the handle 106 may be extended at least until a button in a first portion meets a button in a second portion, thereby selectively, fixedly holding the extended handle in a desired configuration.

Figure 2A:
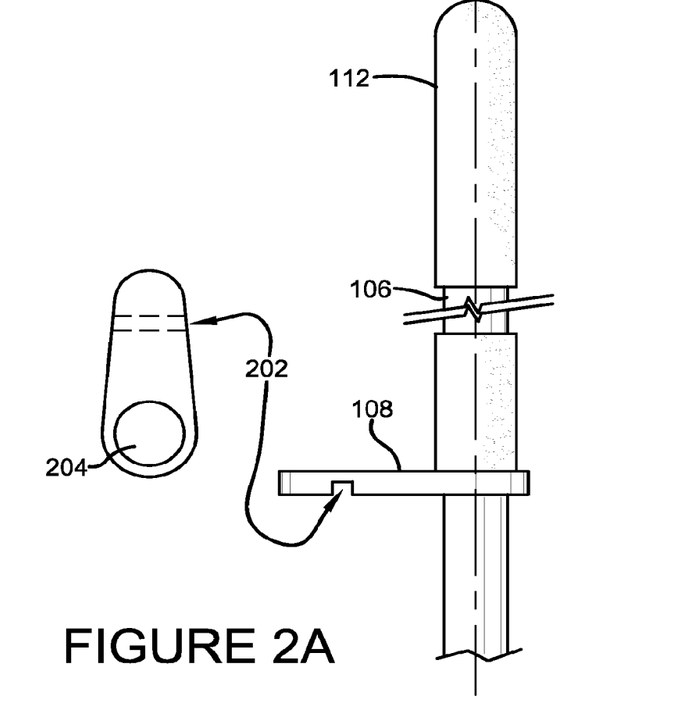
FIG. 2A is a component diagram illustrating and example implementation of at least a portion of a container transport device.
Figure 2B:
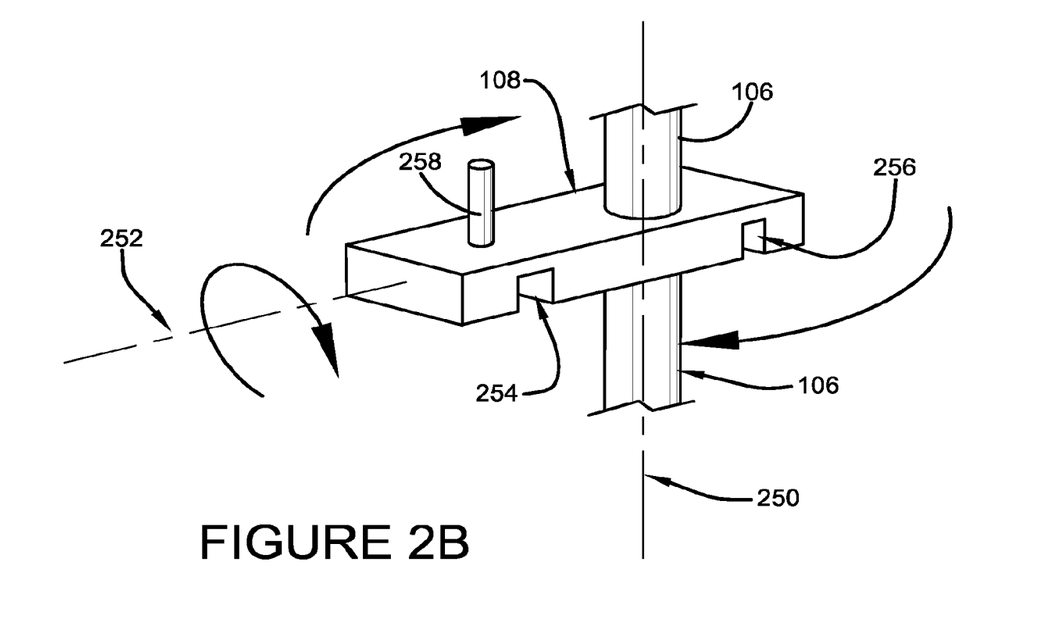
FIG. 2B is a component diagram illustrating and example implementation of at least a portion of a container transport device.

In FIGS. 1A and 1B, and as further illustrated in FIGS. 2A and 2B, the exemplary device 100 further comprises a clamping member 108 that is selectively engaged with the handle 106. The clamping member 108 may be selectively engaged with the handle 106 using a through hole 204 disposed in a second end of the clamping member 108. In one implementation, the clamping member 108 is configured to slide along at least a portion of a length of the handle 106 (e.g., up and down), for example, to adjust for varying heights of a target container, and/or to engage and/or disengage from a container.

In one implementation, the clamping member 108 can comprise a top notch 202 that is disposed at a first end of the clamping member 108. The top notch 202 can be configured to selectively engage a top portion of a first container, such as a lid portion and/or a lip of the container. As one example, the first container may comprise a bucket or drum (e.g., three gallon, five gallon, thirty-five gallon, fifty-five gallon, etc.) having a lid disposed thereon. In this example, the first notch may be configured to engage a raised lip portion of the lid that is in place on top of the bucket or drum, and/or the lip of an open bucket (e.g., without a lid).

In one implementation, as Illustrated in FIG. 2B, the clamping member 108 can be further configured to rotate around a handle axis 250. In this implementation, the clamping member 108 can comprise a first top notch 254, disposed at a first end of the clamping member 108, and a second top notch 256 disposed at a second end of the clamping member 108. In this implementation, the second notch 256 can be configured to selectively engage a top portion of a second container. As one example, the second container may comprise a bucket or drum without a lid disposed thereon, and/or a different sized container. In this example, the second notch 256 may be configured to engage a lip on the top of the different sized container lid, or open bucket or drum. Further, in one implementation, the clamping member 108 may be selectively rotated around the handle axis 250, such that the appropriate end of the clamping member 108 is facing forward. For example, the second end can be rotated forward so that the second top notch 256 can be engaged to a lip of the bucket or drum; and/or the first end can be rotated forward so that the first top notch 254 can be engaged to a portion of a lid on the bucket or drum. Further, in one implementation, the through hole 204 may be disposed in a central portion of the clamping member to appropriately accommodate the rotation around the handle axis 250.

In one implementation, as illustrated in FIG. 2B, the clamping member 108 may comprise a third container engaging member 258. In one implementation, the clamping member 108 can be rotated around a clamping member longitudinal axis 252, such that the third container engaging member 258 is disposed in a downward configuration (e.g., and the first top notch 254 and/or second top notch 256 are disposed in an upward configuration). As one example, the clamping member 108 may be selectively disengaged from the handle 106, rotated around the clamping member longitudinal axis 252 into the desired configuration, and selectively re-engaged with the handle 106. In this way, for example, the third container engaging member 258 may be disposed to be selectively engaged with a top portion of a third container (e.g., a one to three gallon can), for example, which may be smaller than containers for which the first and/or second top notches 254, 256 are configured to engage.

In one implementation, the clamping member 108 may comprise metal, wood, plastic, polymer, graphite, fiberglass and/or a mixture thereof, for example, selected using sound engineering judgment. Further, the clamping member may be manufactured by forming the member as a single unit (e.g., forging, molding, milling, etc.), or, for example, the third container engaging member 258 may be formed separately and fixedly engaged with the body of the clamping member 108. Additionally, in one implementation, a handle through hole 204 may be formed through the clamping member 108 and configured to be selectively engaged with the handle 106. That is, for example, the through hole 204 may be sized to receive the diameter of the handle 106, for example, such that the clamping member 108 may be selectively slid up and/or down at least a portion of the handle 106 to engage and/or disengage with a container. In one implementation, the handle through hole 204 may be formed at an angle that is not perpendicular to a top surface of the clamping member 108. For example, the handle 106 may be angled with respect to the base member 102 (e.g., ergonomically), and the handle through hole 204 may be formed at a similar angle to effectively engage the top of a container.

Figure 4A:
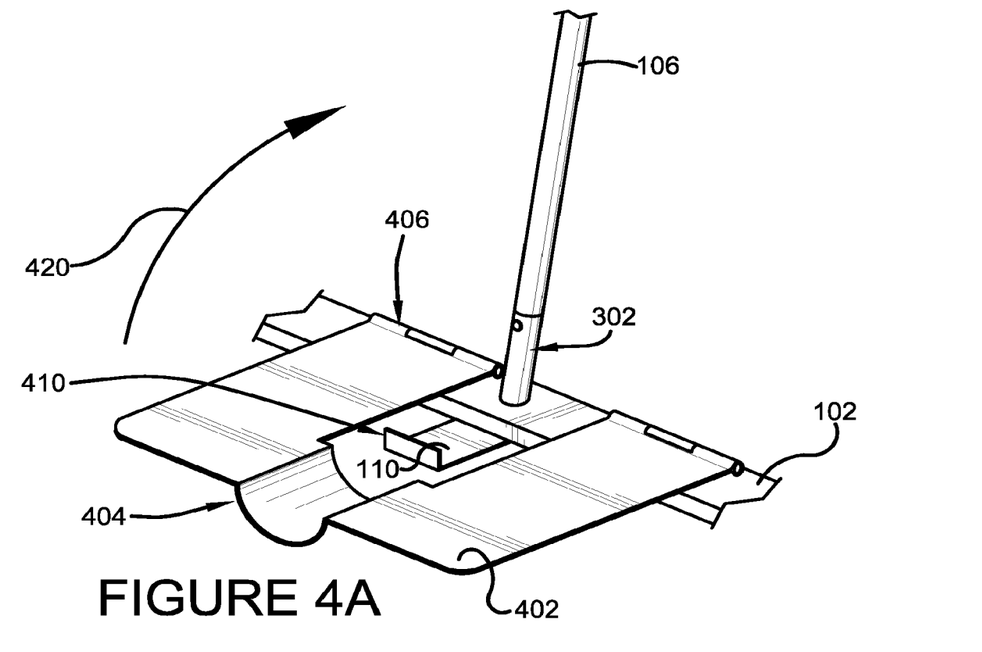
FIGS. 4A and 4B are component diagrams illustrating an example implementation of at least a portion of a container transport device.
Figure 4B:
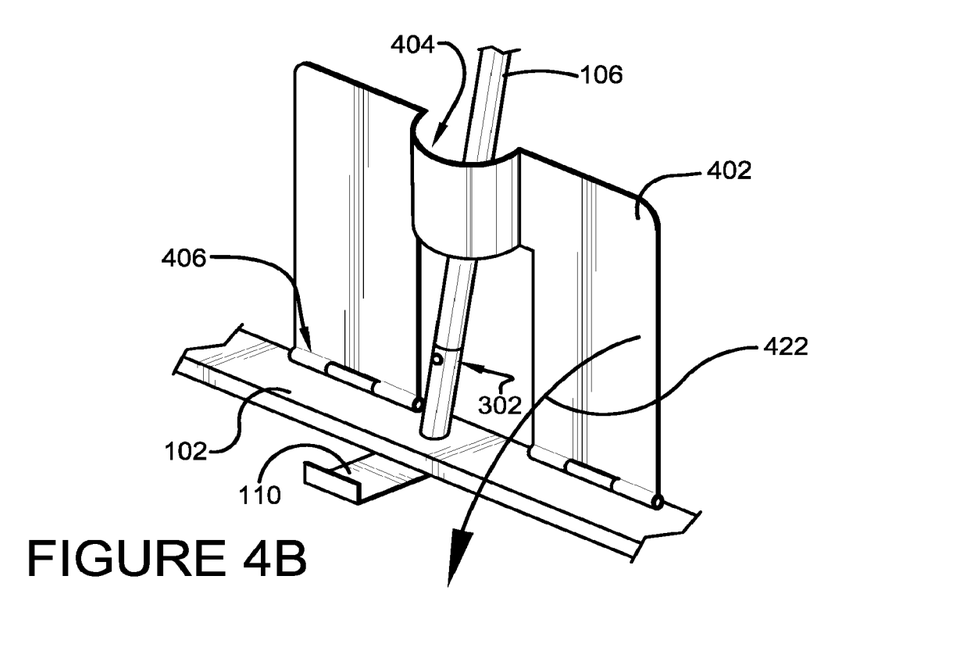

Returning to FIGS. 1A and 1B, and as further illustrated in FIGS. 4A and 4B, the exemplary device 100 can comprise a base engaging member 110 that is operably coupled with the base member 102. The base engaging member 110 can be configured to selectively engage a bottom portion of a target container (e.g., a container targeted for lifting and/or transporting, such as the first container, second container, and/or third container). In one implementation, as illustrated in FIGS. 4A and 4B, the base engaging member 110 can comprise a container bottom lip engaging member 410. For example, the target container may comprise a lip/edge on the bottom wall of the container. In this example, the container bottom lip engaging member 410 may engage with the lip/edge on the bottom wall of the container, effectively mitigating undesired movement (e.g., sliding) of the container from the exemplary device 100, such as during lifting and/or transportation.

In one implementation, the base engaging member 110 may comprise one or more hook-and-loop fasteners (e.g., VELCRO). For example, a first portion (e.g., hook) of the hook-and-loop fastener may be disposed on the base engaging member 110 and a second portion (e.g., loop) may be disposed on the bottom of the container. In another implementation, a second set of hook-and-loop fasteners may be disposed on the handle 106 and a side wall of the container. In this way, the container may be effectively secured to the exemplary device 100 during transportation, mitigating undesired movement (e.g., sliding) off the device.

As one example, the exemplary device 100 may be transported to a target container, such as a drum, bucket, or can, by a user, using the wheel members 104a, 104b, and the handle 106. In this example, the user may engage the bottom of the container by sliding the base engaging member 110 under the bottom edge of the container, thereby engaging the container bottom lip engaging member 410 with the lip of the bottom wall facing the user. Further, in this example, the user may slidably engage the clamping member 108 with a top of the container, after selecting the appropriate notch 202, 204 (e.g., or the third container engaging member 206) for the top of the container. Additionally, the user may lift the container from the ground, for example, by tilting the handle 106 downward, thereby rotating the base member 102 around the lateral base member axis. The container can then be transported to a desired location, for example, merely by guiding the exemplary device 100 using the handle 106.

FIGS. 4A and 4B are component diagrams illustrating one example implementation of at least a portion of a container transport device. In this implementation, the container transport device may comprise a hinged bracket 402. The hinged bracket 402 can comprise one or more hinges 406 fixedly engaged with the base member 102, and configured to allow the hinged bracket 402 to be selectively rotated (e.g., flipped) up 420 against the handle 106. Further, the hinged bracket 402 can be selectively rotated (e.g., flipped) down 422, for example, such that it is relatively parallel to a floor surface. In one implementation, the hinged bracket 402 can comprise a handle recess 404 configured to fit the handle when the hinged bracket 402 is disposed in an up position 420. As one example, when the hinged bracket 402 is disposed in a down position 422, the bracket 402 may be used to shelve a container, and/or may be used as a traditional hand dolly or cart.

Figure 5:
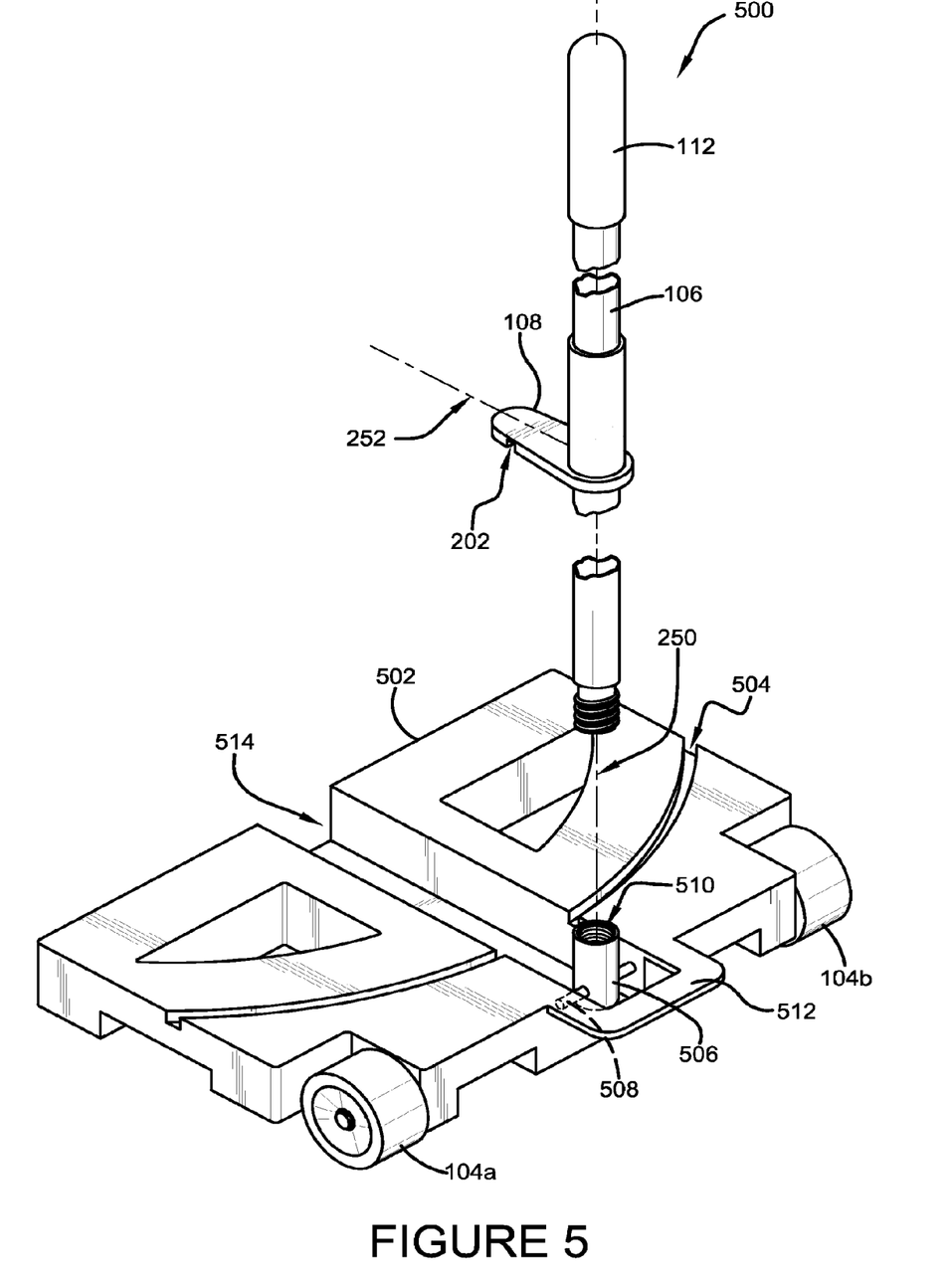
FIG. 5 is a component diagram illustrating another implementation of an exemplary container transport device.
Figure 6:
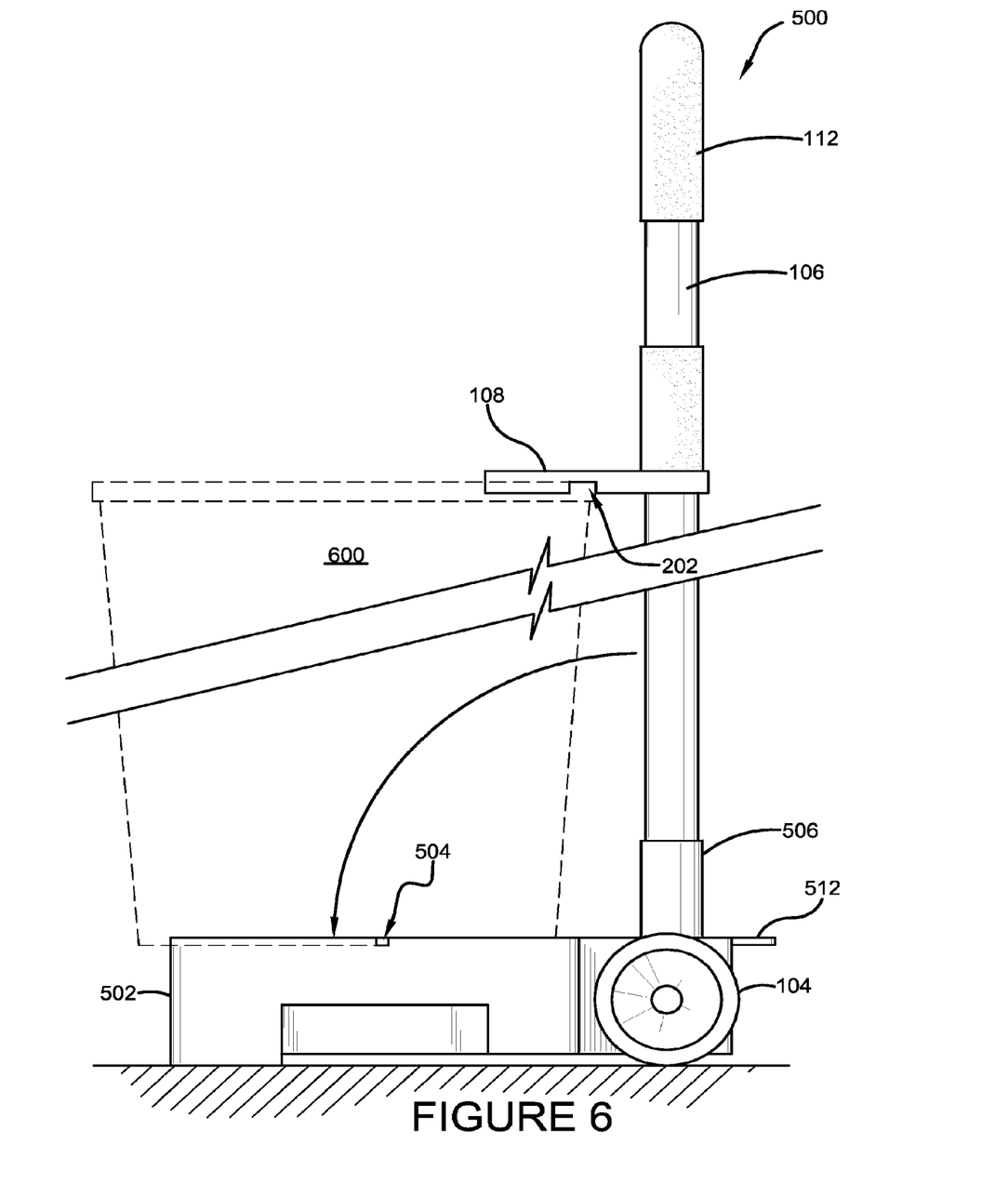
FIG. 6 is a component diagram illustrating an example implementation of a container transport device.

FIG. 5 is a component diagram illustrating another implementation of an exemplary container transport device 500, and FIG. 6 is a component diagram illustrating an example implementation of the container transport device 500. With continued reference to FIGS. 1A, 1B, 2A and 2B, the exemplary container transport device 500 comprises a base member 502 that is configured to support a first container 600. The base member 502 comprises a first bottom notch 504 that is configured selectively engage a bottom portion of the first container 600. In one implementation, the first bottom notch 504 may be shaped to selectively engage with a bottom lip portion of an edge area of the container 600, such as comprising an arc that corresponds to an arc of the bottom portion of a target container 600. Further, the first bottom notch 504 may comprise a depth (e.g., from a top of the base member 502) that effectively engages the bottom portion of a target container 600, for example, to mitigate disengagement from the container 600 (e.g., falling off the container transport device 500) during transportation.

The base member 502 can further comprise a second bottom notch 514 that may be configured to receive the handle 106 when the handle 106 is selectively placed in a folded position, as illustrated in FIG. 6. For example, the handle 106 may be folded down and into the second bottom notch 514, and/or the base member 502 may be folded up, such that the handle 106 is recessed in the second bottom notch 514, thereby creating a more compact footprint for the container transport device 500.

Further, in one implementation, as illustrated in FIG. 5, a handle receiving member 506 may be rotationally engaged with the base member 502. As one example, the handle receiving member 506 may be rotationally engaged with a base rod 508 disposed centrally, at a rear portion of the base member 502. In this example, the base rod 508 may be fixedly engaged with the base member 502, such that the handle 106 receiving member 506 can be rotated around the base rod 508, thereby allowing the handle 106 to be selectively folded into the second bottom notch 514.

Additionally, the base member may comprise a handle engagement extension 512, fixedly engaged with the base member 502 and disposed centrally and rearward of the handle receiving member 506. The handle engagement extension 512 can be configured to provide a mechanical stop for rotation of the handle 106 in a rearward angular displacement with respect to the base member 502. That is, for example, when the handle is tilted rearward, such as to lift the front of the base member 502 off the ground, the handle engagement extension 512 stops the rearward tilt of the handle 106, thereby causing the base 502 member to be lifted off the ground with rearward angular displacement corresponding to the handle 106.

In one implementation, the handle receiving member 506 may comprise a threaded portion 510, such as a female threaded portion, configured to selectively engage a corresponding threaded portion (e.g., male threaded portion of the handle 106). In this implementation, for example, the handle 106 may be selectively engaged with the base member 502 by threading the handle into the handle receiving member 506, and selectively disengaged by unthreading it from the handle receiving member 506. In one implementation, the base member 502 may comprise one or more cut-outs 516. The cut-outs 516 may allow for the base member 502 to comprise less material, thereby weighing less (e.g., being lighter).

Figure 7:
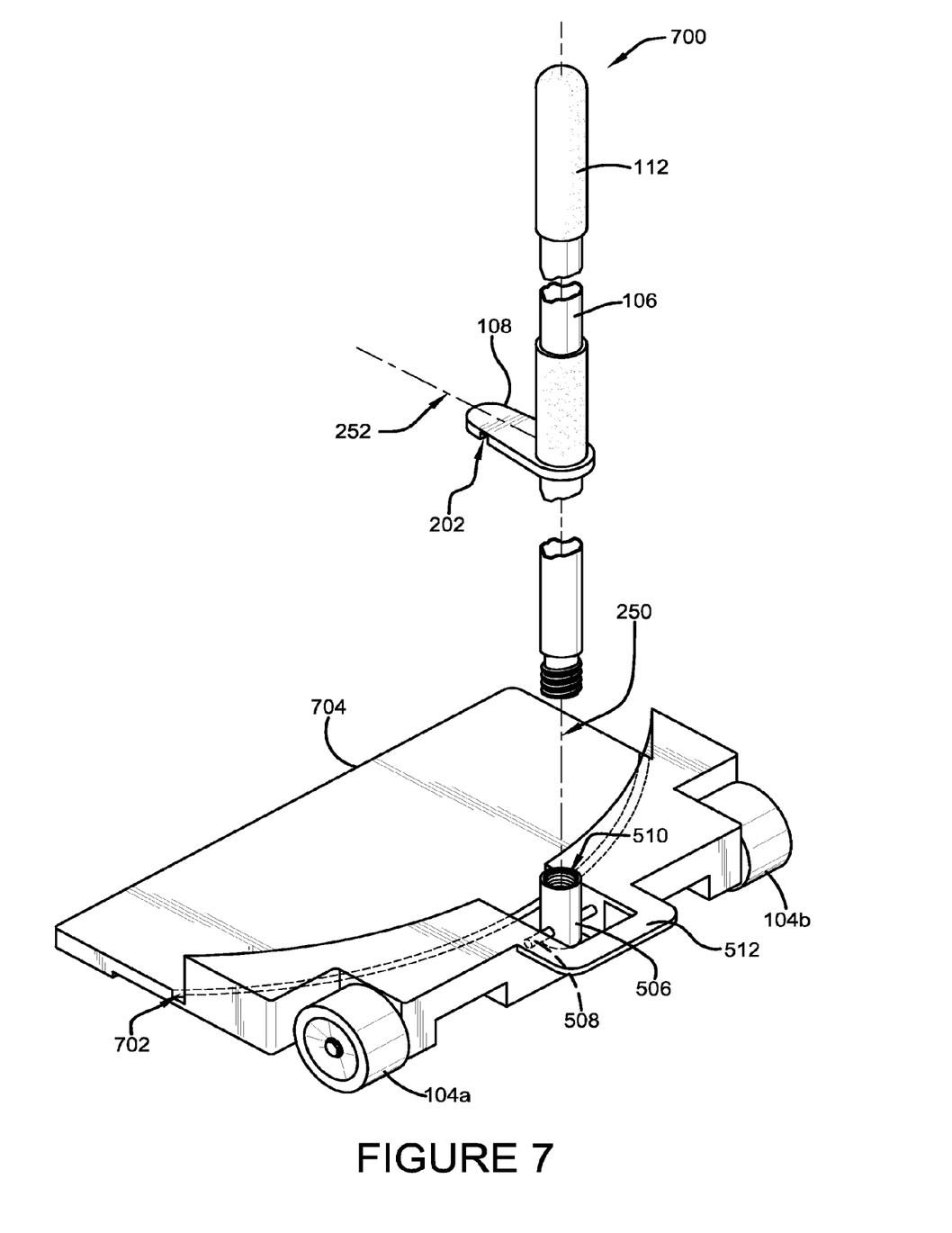
FIG. 7 is a component diagram illustrating another implementation of an exemplary container transport device.
Figure 8:
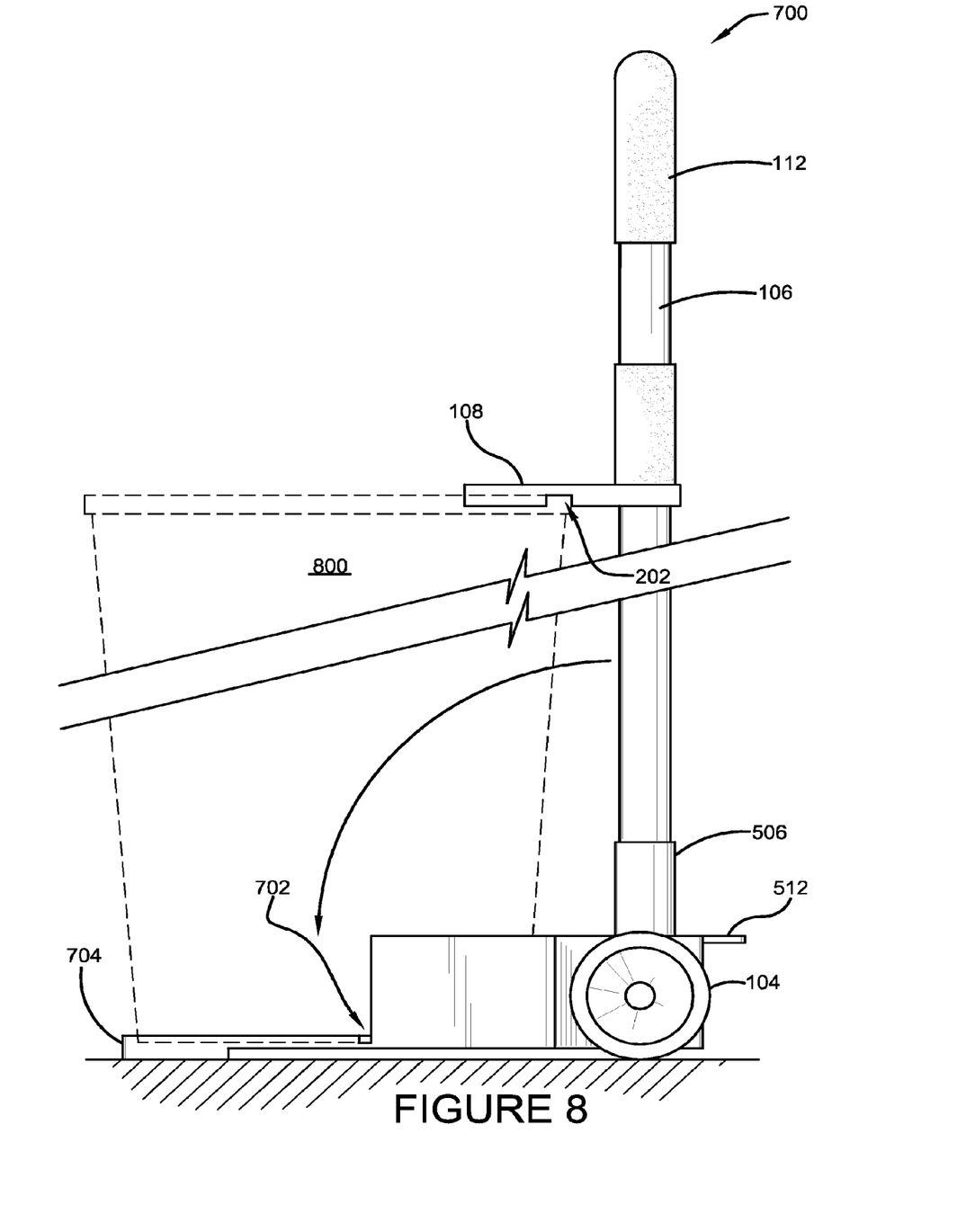
FIG. 8 is a component diagram illustrating an example implementation of a container transport device.

FIG. 7 is a component diagram illustrating yet another implementation of an exemplary container transport device 700, and FIG. 8 is a component diagram illustrating an example implementation of the container transport device 700. With continued reference to FIGS. 1A, 1B, 2A and 2B, the exemplary container transport device 700 comprises a base member 704 that is configured to support a second container 800. The base member 704 comprises a bottom notch 702 that is configured selectively engage a bottom portion of the second container 800. In one implementation, the bottom notch 702 may be shaped to selectively engage with a bottom lip portion of an edge area of the container 800, such as comprising an arc that corresponds to an arc of the bottom portion of a target container 800. Further, the bottom notch 702 may comprise a depth (e.g., from a top of the base member 704) that effectively engages the bottom portion of a target container 800, for example, to mitigate disengagement from the container 800 (e.g., falling off the container transport device 700) during transportation.

Further, in this example implementation 700, a front portion of the base member 704 may comprise a smaller height dimension than a rear portion of the base member 704. In one implementation, the height of the front portion may be dimensioned to effectively accommodate engaging an underside of a target container 800, for example, by sliding the front portion under the target container 800. Further, in this implementation, the height of the rear portion may be dimensioned to effectively provide a mechanical stop and/or a rear support for the target container 800, when the target container 800 is engaged with the base member 704. That is, for example, the front of the base member may be thin enough to slide under the container 800, yet thick enough to provide ridged support for engaging the container during transport; and, the rear of the base member 704 may rise high enough to provide a support to the container 800 during transport (e.g., mitigating undesired movement of the container).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A container transport device, comprising:
   a base member;
   one or more wheel members, operably coupled with the base member, and configured to support the base member above an associated floor surface, and to provide mobility to the device;
   a handle, selectively engaged with the base member at a first end of the handle, and comprising: a grip disposed at a second end of the handle, the handle configured to cause the base member to rotate around a base member lateral axis corresponding to an angular displacement of the handle;
   a clamping member, selectively engaged with the handle, and configured to slide along at least a portion of a length of the handle, and to rotate around a handle axis, the clamping member comprising:
   a first notch disposed at a first end, and configured to selectively engage a top portion of first associated container; and
   a second notch disposed at a second end, and configured to selectively engage a top portion of a second associated container,
   wherein the first and second notches are formed on a first side of the clamping member, a container engaging member is formed on a second side of the clamping member that is opposite the first side and wherein the clamping member is selectively: disengageable from the handle; rotatable with respect to the handle; and, reengageable to the handle in an orientation where the container engaging member is configured to selectively engage a top portion of a third associated container; and,
   a base engaging member, operably coupled with the base member, and configured to selectively engage a bottom portion of one or more of the first associated container and the second associated container.

2. The container transport device of claim 1 further comprising:
   an attachment adapter having an opening that selectively receives the first end of the handle and a base member engagement member that selectively engages with the base member.

3. The container transport device of claim 2 further comprising a button that is retractable into the handle and biased outward from the handle to fix the handle to the attachment adapter.

4. The container transport device of claim 1 wherein:
   at least one of the first and second notches extend into the clamping member; and, the container engaging member extends out from the clamping member.

5. The container transport device of claim 4 wherein the base member comprises a third notch configured to selectively engage a bottom portion of at least one of the first, second and third associated containers.

* * * * *